United States Patent
Finkenzeller et al.

(10) Patent No.: US 10,074,087 B2
(45) Date of Patent: Sep. 11, 2018

(54) METHOD FOR CARRYING OUT A TRANSACTION BETWEEN A PORTABLE DATA CARRIER AND A TERMINAL

(75) Inventors: Klaus Finkenzeller, Unterfohring (DE); Wolfgang Rankl, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 1278 days.

(21) Appl. No.: 13/522,630

(22) PCT Filed: Jan. 13, 2011

(86) PCT No.: PCT/EP2011/000133
§ 371 (c)(1),
(2), (4) Date: Jul. 17, 2012

(87) PCT Pub. No.: WO2011/088970
PCT Pub. Date: Jul. 28, 2011

(65) Prior Publication Data
US 2012/0290481 A1 Nov. 15, 2012

(30) Foreign Application Priority Data
Jan. 20, 2010 (DE) ........................ 10 2010 005 051

(51) Int. Cl.
*G06Q 40/00* (2012.01)
*G06Q 20/32* (2012.01)
*G06Q 20/40* (2012.01)

(52) U.S. Cl.
CPC ......... *G06Q 20/3278* (2013.01); *G06Q 20/32* (2013.01); *G06Q 20/3224* (2013.01); *G06Q 20/40* (2013.01)

(58) Field of Classification Search
None
See application file for complete search history.

(56) References Cited

U.S. PATENT DOCUMENTS 7,669,760 B1* 3/2010 Zettner ............... G06Q 20/102
235/375
8,005,426 B2 8/2011 Huomo et al.
(Continued)

FOREIGN PATENT DOCUMENTS

CN 101171604 A 4/2008
CN 101395890 A 3/2009
(Continued)

OTHER PUBLICATIONS

Distance Bounding, Drimer, Murdoch 2007.*
(Continued)

*Primary Examiner* — Abhishek Vyas
(74) *Attorney, Agent, or Firm* — Workman Nydegger

(57) ABSTRACT

A method for carrying out a transaction between a portable data carrier, such as a chip card, and a terminal is described. An information item (TID) about the terminal is transferred to the portable data carrier upon the transmission of transaction data by a communication between the portable data carrier and the terminal. As a result, the portable data carrier obtains from the information item a locational position (ZID, WID, GID) of the terminal. Further, there is ascertained a locational position (OP) of the portable data carrier to which the portable data carrier has access. Finally, the portable data carrier compares the locational position (ZID, WID, GID) of the terminal with its locational position (OP), and initiates a measure for protecting the transaction in case a deviation between the two locational positions (ZID, WID, GID; OP) exceeds a predetermined threshold.

17 Claims, 1 Drawing Sheet

(56) References Cited

U.S. PATENT DOCUMENTS

| | | | | |
|---|---|---|---|---|
| 8,046,261 | B2* | 10/2011 | Ghosh | G06Q 20/045 235/380 |
| 9,485,092 | B2* | 11/2016 | Smets | H04L 9/0841 |
| 2003/0169881 | A1* | 9/2003 | Niedermeyer | G06Q 20/04 380/258 |
| 2006/0237531 | A1 | 10/2006 | Heffez et al. | |
| 2007/0249288 | A1 | 10/2007 | Moallemi et al. | |
| 2008/0109375 | A1* | 5/2008 | Ricci | G01S 5/0027 705/76 |
| 2008/0250243 | A1* | 10/2008 | Bretheim | H04L 9/3271 713/168 |
| 2009/0012898 | A1* | 1/2009 | Sharma | G06Q 20/24 705/44 |
| 2009/0068982 | A1* | 3/2009 | Chen | G06Q 20/108 455/407 |
| 2009/0098825 | A1 | 4/2009 | Huomo et al. | |
| 2009/0102712 | A1* | 4/2009 | Heffez | G06Q 20/32 342/357.55 |
| 2009/0103730 | A1* | 4/2009 | Ward | G06Q 20/02 380/258 |
| 2009/0222891 | A1* | 9/2009 | Heffez | H04L 63/08 726/3 |
| 2009/0254476 | A1 | 10/2009 | Sharma et al. | |

FOREIGN PATENT DOCUMENTS

| | | |
|---|---|---|
| EP | 2081140 A1 | 7/2009 |
| KR | 20030043886 A | 6/2003 |
| WO | 2009035824 A2 | 3/2009 |
| WO | 2009/148387 A1 | 12/2009 |

OTHER PUBLICATIONS

International Preliminary Report on Patentability for PCT/EP2011/000133, dated Aug. 7, 2012.

International Search Report for PCT/EP2011/000133, dated Apr. 14, 2011.

Chinese Search Report from Chinese Application No. 2011800066554, dated Jul. 27, 2015.

* cited by examiner

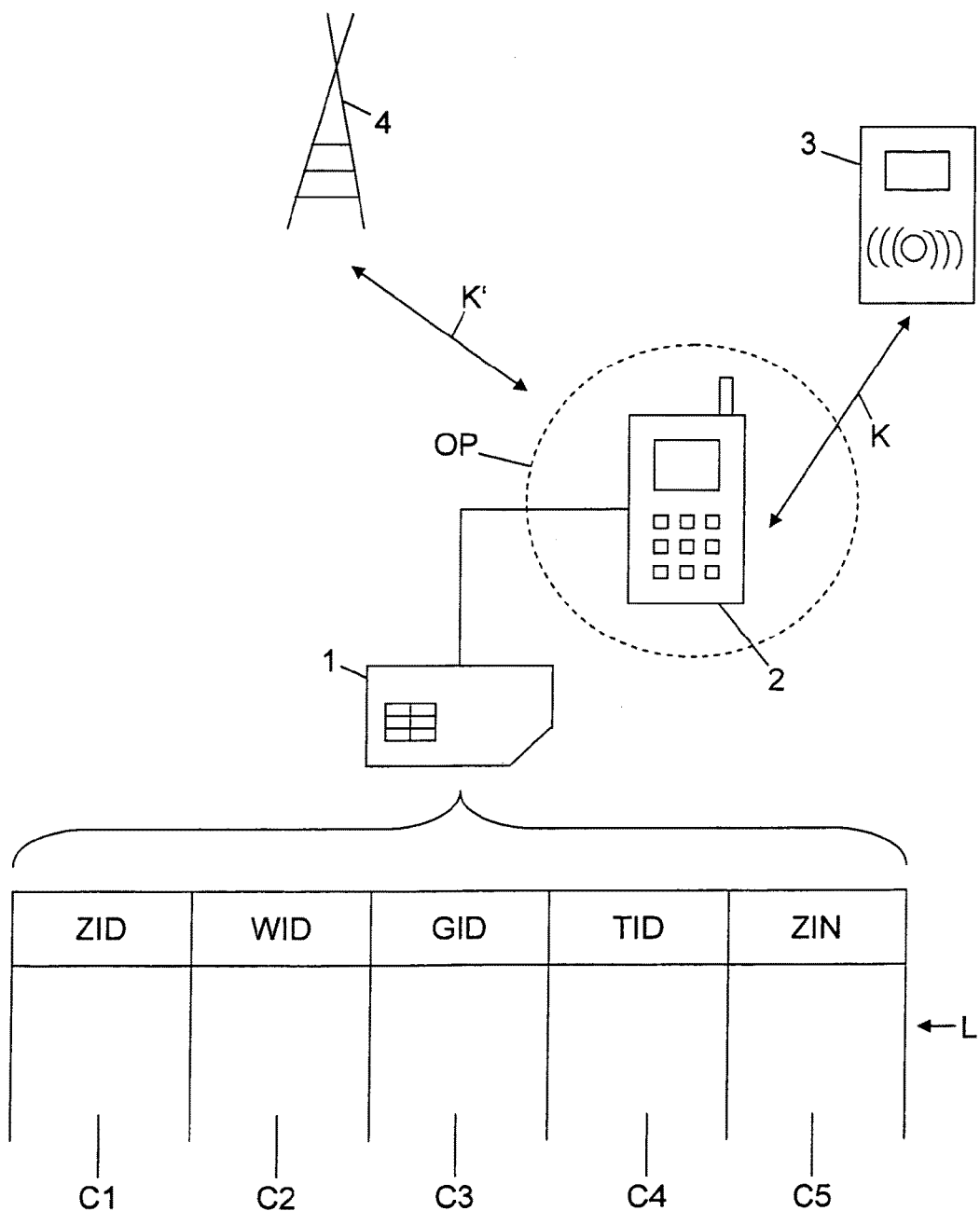

METHOD FOR CARRYING OUT A TRANSACTION BETWEEN A PORTABLE DATA CARRIER AND A TERMINAL

BACKGROUND OF THE INVENTION

A. Field of the Invention

This invention relates to a method for carrying out a transaction between a portable data carrier, in particular a chip card, and a terminal.

B. Related Art

Upon the carrying out of transactions, in particular payment operations, between a portable data carrier and a terminal, sensitive transaction data which can be the target of attacks by third parties are exchanged between the data carrier and the terminal. In particular upon an NFC communication (NFC=Near Field Communication), which is employed more and more frequently nowadays for the contactless exchange of transaction data between data carrier and terminal, so-called range extension attacks, which are also referred to as relay attacks, are known. In a relay attack, an attacker extends the communication range of a portable data carrier using a special terminal in order to read out transaction data which are then utilized for carrying out transactions via a dummy data carrier on a regular terminal positioned remotely from the attacked data carrier.

For preventing attacks in which an attacker uses transaction data of a portable data carrier without authorization on a terminal which is positioned remotely from the attacked data carrier, there are methods known from the prior art which involve comparing the locational position of the portable data carrier with the position of the terminal on which a transaction is carried out. In the document US 2009/0012898 A1, the transferred transaction data are relayed, upon the carrying out of a transaction between a payment card and a transaction terminal, to a transaction processing network in which the location of the transaction is established on the basis of the transaction information. The payment card here is associated with a mobile radio device whose position, e.g. via a mobile radio network, is determined by a server or is made available thereto. Subsequently there is effected a comparison of the location of the transaction with the position of the mobile radio device. Should there be an insufficient match between these two positions, the transaction is blocked.

The print KR 2003 0043886 describes a system for confirming a payment operation carried out via a credit card. A terminal which reads out the data from the credit card for carrying out the payment transfers the read-out data as well as its own position to a confirmation system in which the validity of the credit card is verified. In the confirmation system there is further effected a verification of the current position of the mobile radio device of the credit-card owner via a mobile radio network. Subsequently the position of the mobile radio device is compared in the confirmation system with the position of the terminal. In case the respective position data do not match, the payment operation is not authorized via the confirmation system.

The methods known from the prior art make it possible to protect against the above-described relay attacks via a comparison of the position of the data carrier with the position of the terminal, but have the disadvantage that there is always used for comparing positions a background system on which the sensitive transaction data are transferred. The transactions might thus be tampered with in the background system, and a user must rely on a sufficient protection of the background system from attacks when carrying out the transactions.

From WO 2009/035824 A there is known a mobile unit which checks the locational position of a terminal. The mobile unit contains a security element and a special trustworthy runtime environment. In a secure memory unit there are stored all security-relevant transaction data. For checking the locational position, the terminal transfers to the mobile unit a certificate which also includes the locational position of the terminal. The certificate can be issued by an independent third entity. The mobile unit checks the certificate and subsequently the locational position, for which purpose it determines its own locational position. The known solution allows the recognition of tampered-with terminals. However, it cannot reliably prevent relay attacks, or it delivers misleading results in this case.

The object of the invention is to provide a method for carrying out transactions, and a corresponding portable data carrier, by which an improved protection from attacks by third parties upon the execution of the transactions is guaranteed.

BRIEF SUMMARY OF THE INVENTION

The method according to the invention serves to carry out a transaction, in particular to carry out a payment operation, between a portable data carrier, such as e.g. a chip card, and a terminal, in particular a public, freely accessible terminal on which users can initiate corresponding transactions with a portable data carrier.

In the method according to the invention, there are transferred, within the framework of the carrying out of the transaction, corresponding transaction data by means of a communication between the portable data carrier and the terminal, whereby the transaction data comprise an information item about the terminal which is transmitted to the portable data carrier. From this information item there results for the portable data carrier a locational position of the terminal. Where applicable, the information item about the terminal can already correspond to the locational position of the terminal. Likewise, it is possible that the locational position is derived from the information item about the terminal in the portable data carrier.

In the method according to the invention, there is further ascertained a locational position of the portable data carrier to which the portable data carrier has access. The locational position can be established here e.g. with one or several of the localization methods described below. Subsequently, the portable data carrier compares the locational position of the terminal with its locational position, and initiates a measure for protecting the transaction in case a deviation between the two locational positions exceeds a predetermined threshold. The threshold upon the exceeding of which a corresponding protective measure is initiated is adjusted here in particular such that it can be assumed upon the exceeding of the threshold that the terminal with which the portable data carrier is communicating is not in the immediate vicinity of the data carrier, but rather arranged at a certain distance therefrom. For example, the threshold can be chosen such that it is greater than the communication range of an NFC communication between data carrier and terminal. The threshold can in particular also take into consideration the accuracy of the positions established for the terminal and the data carrier.

The method according to the invention has the advantage that a comparison of the locational positions of terminal and data carrier is performed directly by the portable data carrier, without sensitive transaction data having to be transferred to further places for verification. In this way, the user of the portable data carrier has the certainty that the check of the locational positions is actually carried out and is not influenced by any tampering in background systems.

The method according to the invention is employed in particular for transactions wherein the transaction data are transmitted between data carrier and terminal on the basis of an NFC communication (NFC=Near Field Communication). The above-mentioned NFC communication according to ISO/IEC 18092 is compatible with ISO/IEC 14443 and is based in particular on the transmission protocol standardized therein. With this communication, data are transferred over short ranges on the basis of high-frequency alternating magnetic fields.

In a further preferred embodiment, the information item about the terminal which is transferred to the portable data carrier comprises a terminal identification, and in the portable data carrier there is deposited a list or table which contains as entries a plurality of terminal identifications with one or several locational positions associated with the respective terminal identification, whereby the locational position of the terminal is established by comparison of the transferred terminal identification with the terminal identifications of the list. That is, one or several locational positions of the terminal result by a looking up of the transferred terminal identification in the list.

In the just described list there can be deposited for a respective terminal identification, where applicable, several locational positions of the corresponding terminal that are based on different localization methods. These differently determined locational positions comprise in particular an identification of the mobile radio cell of a mobile radio network in which cell the terminal with the respective terminal identification is located, and/or location coordinates derived from a local radio network, such as e.g. a WLAN network, whereby in this case the terminal lies within range of the corresponding radio network. Alternatively or additionally, the locational position can also be described e.g. by GPS coordinates (GPS=Global Positioning System) of the terminal or position coordinates of another position determining system. With the last-mentioned coordinates there is obtained the highest accuracy upon position determination. In the just described embodiment, in particular also the locational position of the portable data carrier is ascertained by at least one of the different localization methods, to thereby make possible a conclusive comparison between the locational positions of data carrier and terminal.

The depositing in the list of several locational positions established on the basis of different methods obtains the advantage that in case a certain way of establishing the locational position of the data carrier is not available, the locational position can be established in a different manner and compared with the corresponding locational position in the list. For example, the case can occur that a position establishment on the basis of a mobile radio network is not possible to the portable data carrier, because there is no network reception at the location of the data carrier. In this case the position of the data carrier can be determined e.g. via GPS and be compared with the GPS coordinates in the list.

In a further embodiment of the method according to the invention, there is deposited in the list, for a respective terminal identification, an additional information item about the terminal with the respective terminal identification. This additional information item can be configured differently and comprise for example a photo of the terminal, address data of the terminal, a logo of the point of sale where the terminal is employed for cashless payment, and the like.

For changes of sites of terminals to be suitably taken into consideration in the method according to the invention, the above-described list, in a further preferred embodiment, is transmitted to the data carrier by a central place and/or updated in the data carrier by the central place, whereby the central place manages the list and represents for example the operator of the corresponding transaction application. The list can be transferred to the portable data carrier here e.g. at regular intervals or upon the occurrence of changes or additions in the list. Likewise, there is the possibility that the portable data carrier itself requests the list from the central place.

The measure initiated by the portable data carrier for protecting the transaction can be configured arbitrarily. Where applicable, the measure can also comprise the abort of the transaction. In a particularly preferred embodiment, however, the measure initiated by the portable data carrier is the outputting of a request for a user to manually confirm the transaction, whereby the transaction is only completed after manual confirmation by the user. If there is no such manual confirmation the transaction is not executed, so that in the end e.g. a corresponding payment operation is not triggered.

The request for manual confirmation of the transaction can be output in particular via a mobile device on or in which the portable data carrier is arranged. There thus exists a local communication connection between the mobile device and the portable data carrier, whereby the portable data carrier can for example be inserted into the mobile device and is connected there to the mobile device via corresponding contacts. The outputting of the request for manual confirmation of the transaction is preferably effected here visually via a corresponding display screen on the mobile device, whereby the mobile device can be for example a mobile radio device and in particular a mobile telephone.

In a particularly preferred embodiment wherein the above-described list with corresponding additional information items about the respective terminals is deposited in the portable data carrier, the additional information item about the terminal is output to a user within the framework of the outputting of the request for manual confirmation of the transaction. Using the output additional information item the user can then verify whether the terminal on which the transaction is being carried out matches the terminal according to the terminal identification from the list. If the additional information item shows for example a photo of the terminal, the user can verify whether the terminal at which he is located matches the terminal in the photo. Likewise, where applicable, displayed address information items can be checked against the actual site of the terminal, or displayed logos be verified.

In a particularly preferred embodiment, the transaction is carried out between a portable data carrier in the form of a subscriber identification card, in particular a SIM and/or USIM (SIM=Subscriber Identity Module; USIM=Universal Subscriber Identity Module), and the terminal. The SIM or USIM module is inserted in a corresponding mobile radio device in order to make possible a communication of the device via a mobile radio network. In this variant of the invention, mobile radio devices can be employed for not only their proper function but also for carrying out corresponding transactions. It need only be ensured here that a corresponding communication between the mobile radio device and a corresponding terminal is possible. Nowadays, mobile radio devices are more and more frequently equipped with communication interfaces suited therefor, in particular in the form of NFC interfaces.

The ascertained locational position of the data carrier can, where applicable, be established by the data carrier itself or by a mobile device on or in which the portable data carrier is arranged. This mobile device can, where applicable, again be a mobile radio device which establishes as a locational position the identification of the mobile radio cell in which it is situated. This locational position can then be compared with a corresponding locational position of the terminal which position is in particular deposited in the above-described list as the identification of a corresponding mobile radio cell. The position establishment can alternatively or additionally also be effected through a mobile GPS-enabled device which determines its GPS position which is in turn preferably compared with a corresponding GPS position in the above-described list. Instead of a GPS position there can of course also be utilized a position in another position determining system, such as a position in the planned Galileo system. Likewise, the locational position can be ascertained e.g. via a radio device which determines its position in a local radio network. This position is preferably in turn compared with a corresponding position from the above-described list. One or several of the above-described functionalities for position determination can, where applicable, also be implemented in a single device, that is, e.g. in a mobile radio device having a GPS antenna and a radio module for a local radio network.

Besides the above-described method, the invention further comprises a portable data carrier, in particular a chip card, for use in this method. The portable data carrier is configured here such that it can carry out a comparison of a locational position of a terminal with a locational position of the portable data carrier, whereby the portable data carrier initiates a measure for protecting the transaction in case a deviation between the two positions exceeds a predetermined threshold.

The invention further relates to a mobile device, in particular a mobile radio device, which comprises the just described portable data carrier and which is usable in the above-described method according to the invention for carrying out a transaction. The mobile device here further comprises a communication interface via which a communication is producible between the portable data carrier and a terminal, in order to transfer to the portable data carrier upon the transmission of transaction data an information item about the terminal from which there results for the portable data carrier a locational position of the terminal. Furthermore, the mobile device includes a means for establishing the locational position of the portable data carrier to which the portable data carrier has access. The portable data carrier compares the locational position of the terminal with its locational position during operation of the mobile device within the framework of the carrying out of a transaction, and initiates a measure for protecting the transaction in case a deviation between the two locational positions exceeds a predetermined threshold.

One or several of the features described hereinabove with regard to the method according to the invention can be part of the portable data carrier according to the invention or of the mobile device according to the invention, provided these features relate to properties of the portable data carrier or of the mobile end device.

BRIEF DESCRIPTION OF THE DRAWING

An embodiment example of the invention will hereinafter be described in detail with reference to the attached FIG. 1.

This FIGURE shows a schematic representation of the carrying out of a cashless payment transaction on the basis of a variant of the method according to the invention.

DETAILED DESCRIPTION OF PREFERRED EMBODIMENTS OF THE INVENTION

In the embodiment example shown in FIG. 1, a user (not shown) intends to carry out a payment function, by means of his mobile telephone 2 having a SIM or USIM 1 inserted therein, on a remote station 3 in the form of a payment terminal. The carrying out of the transaction is effected by means of a communication between the mobile telephone 2 or the SIM/USIM 1 and the terminal 3 via a contactless NFC interface, by which data are transmitted by means of high-frequency alternating magnetic fields on the basis of NFC communication (also referred to as near-field communication). For the NFC communication the mobile telephone 2 and the remote station 3 comprise corresponding NFC modules, whereby the contactless data exchange via these modules is indicated by the double arrow K in FIG. 1.

In the scenario of FIG. 1, the mobile telephone 2 is located within range of a base station 4 of a mobile radio network in which the user can communicate with other subscribers via his telephone. With the double arrow K' there is indicated in FIG. 1 the communication in the mobile radio network, whereby it is not necessary that a mobile radio connection is set up via the mobile telephone, however, in the hereinafter described embodiment of the method according to the invention.

As already mentioned above, a user can carry out cashless payment operations via the terminal 3 by means of his mobile telephone 2, whereby the mobile telephone is prepared in a per se known manner for carrying out contactless funds transfer applications. For this purpose, a security element with a corresponding funds transfer application is provided in the mobile telephone, whereby the funds transfer application can for example be contained in the controller of the SIM/USIM or can also be housed as an additional security chip in the SIM/USIM. Upon the carrying out of the funds transfer application there is the danger here that, through the relay attacks mentioned at the outset, the payment functionality of the mobile telephone is utilized by dummy chip cards on payment terminals which are arranged remotely from the mobile telephone 2. To recognize such attacks, a comparison of the locational position of the mobile telephone 2 with the locational position of the payment terminal 3 is carried out in the embodiment described here, as to be explained hereinafter.

For establishing the locational position of the terminal 3 with which the mobile telephone 2 is communicating via near-field communication for carrying out a payment, there is deposited in the SIM/USIM 1 a list L, which is indicated in the lower part of FIG. 1. This list contains five columns C1, C2, . . . , C5, whereby there is deposited in the column C4 an identification TID from a plurality of terminals. The terminal identification is stated here in particular in the form of an IFD identity (IFD=Intelligent Field Device). For each terminal identification TID, i.e. for each line in the list, locational positions for the corresponding terminal are stored, whereby these locational positions have been established in different ways.

The column C1 of the list L contains as a locational position the identity ZID of that mobile radio cell in which of a respective terminal is located. The column C2 contains as a locational position WID the location coordinates of a respective terminal that are determined via a local WLAN network, provided that the terminal is arranged within a WLAN network. Further, the list contains in the column C3 the corresponding GPS coordinates GID of a respective terminal. Where applicable, it is possible that location coordinates established in a different way are also deposited in the list, or only a portion of the location coordinates are contained in the list according to the columns C1 to C3, or entries are not deposited in each of the columns for all terminals in the list. In the embodiment of FIG. 1, the list L further contains in the column C5 additional information items ZIN which characterize the terminal in the corresponding line, for example a photo of the terminal, a logo of the store in which the terminal is located, the address of the terminal site and, where applicable, further terminal-related information items. These information items can be output on the mobile telephone, in particular on its display screen, as to be described more closely below.

For carrying out a payment transaction, a user positions his mobile telephone 2 within range of the terminal 3, whereby the transaction is subsequently carried out on the basis of an NFC communication via a corresponding data exchange. Within the framework of the transaction the terminal identification of the terminal 3 is, in so doing, transferred to the mobile telephone 2. Before the end of the payment operation the received terminal identification is picked out from the column C4 in the list L, so that there are available in the mobile telephone corresponding locational positions on the basis of a cell identity ZID and/or on the basis of WLAN coordinates WID and/or GPS coordinates GID. These location information items are compared with the current locational position of the mobile telephone 2, whereby this position is determined by the telephone itself via suitable means. The locational position established by the telephone is indicated here in FIG. 1 by a dashed circle around the telephone and designated OP. The locational position that is easiest to determine is the identity of the mobile radio cell of the mobile network operator in which cell the telephone is currently located. This information item is directly available to the SIM/USIM. This information item can then be compared with the corresponding entry of the terminal 3 from the column C1 in the list L.

Alternatively or additionally, the mobile telephone 2 can establish its position, where applicable, also from information items of a WLAN network, whereby in this case the location information item is compared with the corresponding entry of the terminal 3 in the column C2 of the list L. Should the mobile telephone 2 have a GPS antenna, it can also establish its GPS locational position, which is then compared with the corresponding entry of the terminal 3 in the column C3 of the list L. In the embodiment described here, there is thus carried out in the SIM/USIM a comparison of one or several locational positions established via the mobile telephone with corresponding entries in the list L. In so doing, the SIM/USIM preferably evaluates all available locational positions, so that e.g. even in the case of a non-available mobile radio network a site comparison can be carried out, for example on the basis of GPS coordinates, depending on the situation.

On the basis of the above comparison of one or several locational positions of the mobile telephone 2 or SIM/USIM 1 with corresponding locational positions of the terminal 3 according to the list L, deviations between these locational positions are subsequently detected in the SIM/USIM. Should these deviations for one or several of the locational positions exceed a predetermined value, this indicates that a relay attack is present, because the terminal 3 which should actually be located in immediate adjacency to the mobile telephone is positioned remotely from this device. In the embodiment described here, a request is output on the display screen of the telephone for the user of the mobile telephone in case the deviation of corresponding locational positions exceeds a predetermined threshold. The predetermined threshold can be chosen differently here depending on the locational resolution of the locational positions determined in different ways, and is adjusted for the respective locational position such that inaccuracies upon the position determination, or a terminal shifted by a few meters with respect to the mobile telephone, does not lead directly to the outputting of a request to the user.

Via the request output on the display screen of the telephone 2, the user is asked to confirm the transaction, with the payment connected therewith, manually, for example by the input of a special key or of a secret code. Only upon confirmation of the transaction is it completed. This obtains an efficient protection against unauthorized relay attacks. In a preferred embodiment, there is also output, within the framework of the outputting of a request to confirm the transaction, the above-described additional information items ZID from the list L, with which items the user can verify in a simple manner whether the terminal used by him actually corresponds to the terminal that is deposited in the list of the SIM/USIM. For example, there can be output the logo of the store, a photo of the terminal or an address of the terminal site, from which items the user can conclude whether the terminal used by him corresponds to the terminal according to the additional information items.

In a variant, the SIM/USIM sends, at regular time intervals or after every carrying out of a transaction, a query to update the list L via the mobile radio network to a central place which manages the contents of the list. The central place here can represent the network operator of the mobile radio network and/or the operator of the corresponding payment application. In response to the query the central place then sends a current list to the SIM/USIM. This ensures that the list is always at the newest version level. To reduce the amount of data to be transmitted, there can, in so doing, also be transmitted by the central place, where applicable, only the changes that have been made in the list since the last query of the SIM/USIM to the central place. If a current list cannot be made available under certain circumstances (e.g. because there exists no connection of the mobile telephone to the mobile radio network), this preferably does not lead, upon the carrying out of a transaction, to the abort of the transaction but only to the outputting of the above-described request to confirm the transaction.

Likewise, there is the possibility that the central place transfers a current list or changes in the list to the mobile telephone on its own initiative. Such a transfer of the list initiated by the central place is necessary here in particular when the mobile network operator renumbers the identities of its mobile radio cells, because this causes the corresponding locational positions in the list to be changed. There also exists here, where applicable, the possibility that the mobile telephone does not receive the list with the renumbering, but is only informed by the central place that a new numbering of the mobile radio cells has been carried out. Provided that the corresponding algorithm for the new numbering is known in the mobile telephone, the telephone can then independently update the cell identities in its list.

The putting into operation of the hereinabove described payment system requires little effort and needs no additional infrastructure. In so doing, in a first step the terminal identifications of all terminals to be integrated can be linked with the respective cell identities of the mobile radio network. A list based on this linkage is then deposited in the SIM/USIM, so that the locational positions of all terminals can be verified by the SIM/USIM via the corresponding cell identities. In an optional step the SIM/USIM or the mobile telephone can, after a carried-out payment transaction, send the currently established coordinates of the mobile telephone (e.g. determined by GPS) to a central database, whereby the coordinates are preferably transmitted via a mobile radio connection. These coordinates are then deposited as the position of the corresponding terminal. After a number, to be defined, of identical location coordinates have been received for a corresponding terminal after respective payment transactions, it can be assumed that the location coordinates define the exact position of the terminal. This position is then ultimately defined as the position of the terminal in the central database, whereby the central database is preferably managed by the central place already mentioned above. A forgery of the just explained procedure is relatively elaborate for an attacker.

The hereinabove described method according to the invention has a number of advantages. In particular, it makes possible a simple and efficient protection against unauthorized relay attacks, whereby an already existing infrastructure can be utilized. Within the framework of the method it is not necessary here to use a background system for the site verification of the terminal, so that no sensitive transaction data need be sent to remote places, which can be problematic in terms of data protection rights. Furthermore, the method, in special embodiments, also makes possible a site determination independently of the availability of a mobile radio network, for example when a site verification is effected on the basis of GPS coordinates.

The invention claimed is:

1. A method for carrying out a wireless electronic transaction between a portable data carrier associated with a mobile device and a terminal such that the portable data carrier prevents unauthorized acquisition of transaction data stored on the portable data carrier, the method comprising:
within a wireless electronic transaction communication between the portable data carrier and the terminal, receiving from the terminal, by the portable data carrier, an information item about the terminal, wherein the information item comprising comprises a terminal identification;
the portable data carrier including an embedded controller and memory unit that are separate from processors and memory of the associated mobile device;
depositing, by a central server, a list that contains as entries a plurality of terminal identifications with one or several locational positions associated with the respective terminal identification, in the memory of portable data carrier;
determining, by the embedded controller of the portable data carrier, a locational position of the terminal based on the information item, by comparing the transferred terminal identification with the terminal identifications of the list;
determining, by the embedded controller of the portable data carrier, a locational position of the portable data carrier, such that both the locational position of the terminal and the locational position of the portable data carrier are determined directly by the portable data carrier without transferring data to other computing systems;
comparing, by the portable data carrier, the locational position of the terminal with the locational position of the portable data carrier to determine a deviation therebetween;
when the deviation does not exceed a predetermined threshold, causing, by the portable data carrier, automatic transmission of the transaction data to the terminal; and
when the deviation exceeds the predetermined threshold, preventing, by the portable data carrier, automatic transmission of the transaction data to the terminal so as to prevent unauthorized acquisition of the transaction data stored on the portable data carrier.

2. The method according to claim 1, wherein the communication between the portable data carrier and the terminal comprises an NFC communication.

3. The method according to claim 1 wherein, in the list there are deposited for a respective terminal identification several locational positions based on different localization methods, and/or GPS coordinates and/or location coordinates, derived from a local radio network, of the terminal with the respective terminal identification.

4. The method according to claim 1, wherein, in the list, there is deposited for a respective terminal identification an additional information item about the terminal with the respective terminal identification.

5. The method according to claim 1, wherein the list is transmitted to the portable data carrier, and/or updated in the portable data carrier, by a central place.

6. The method according to claim 1,
wherein the portable data carrier is positioned in or on a mobile device, and
wherein the method further comprises, when the deviation exceeds the predetermined threshold:
outputting a request, by the portable data carrier, for a user to manually confirm the transaction through the mobile device;
obtaining, by the portable data carrier through the mobile device, manual user confirmation for the transaction; and
upon obtaining manual user confirmation, causing, by the portable data carrier, transmission of the payment transaction data to the terminal.

7. The method according to claim 6, wherein, in the list, there is deposited for a respective terminal identification an additional information item about the terminal with the respective terminal identification, wherein the request comprises the additional information item about the terminal to be used in obtaining manual user confirmation.

8. The method according to claim 1, wherein the portable data carrier is a subscriber identification module (SIM), positioned in a mobile device and the terminal is a remote station, separate from the mobile device.

9. The method according to claim 1,
wherein the portable data carrier is positioned in or on a mobile device, and
wherein determining the locational position of the portable data carrier comprises:
ascertaining a locational position by the mobile device, and/or by a GPS-enabled device which determines a GPS position, and/or by a radio device which determines a position in a local radio network; and
obtaining from the mobile device, by the portable data carrier, the locational position.

10. A portable data carrier configured to perform the method for carrying out a transaction according to claim 1.

11. A system configured to wirelessly communicate with a terminal, the system comprising:
a mobile device; and
a portable data carrier positioned in or on the mobile device,
wherein the mobile device includes a communication interface via which a wireless electronic communication is producible between the portable data carrier and the terminal, to receive from the terminal an information item about the terminal and to transmit to the terminal, transaction data stored on the portable data carrier, the portable data carrier including an embedded controller and secure memory unit that are separate from processors and memory of the mobile device, and
wherein the portable data carrier is configured to perform a method for carrying out a wireless electronic transaction between the portable data carrier and the terminal, the method comprising:
receiving an information item about the terminal over the wireless communication interface, the information item including a terminal identification;
determining, by the embedded controller of the portable data carrier, a locational position of the terminal based on the information item, by obtaining a locational position associated with the received terminal identification from a list of terminal identifications and associated locational positions, the list being stored on the portable data carrier;
determining, by the embedded controller of the portable data carrier, a locational position of the portable data carrier, such that both the locational position of the terminal and the locational position of the portable data carrier are determined directly by the portable data carrier without transferring data to other computing systems;
determining a deviation between the locational position of the terminal and the locational position of the portable data carrier;
when the deviation does not exceed the predetermined threshold, causing automatic transmission of the transaction data to the terminal over the communication interface; and
when the deviation exceeds the predetermined threshold, preventing automatic transmission of the transaction data to the terminal so as to prevent unauthorized acquisition of the transaction data stored on the portable data carrier.

12. The method of claim 1, wherein the wireless electronic transaction between the portable data carrier and the terminal is a payment operation.

13. The system of claim 11, further comprising means for ascertaining a locational position, and wherein the portable data carrier is configured to determine the locational position of the portable data carrier by obtaining the locational position from the means for ascertaining the locational position.

14. The system of claim 13, wherein the means for ascertaining the locational position comprises one or more of:
a device within the mobile device,
a GPS-enabled device which determines a GPS position, and
a radio device which determines a position in a local radio network.

15. A method for authenticating wireless electronic payment transactions from a portable data carrier to a remote terminal and selectively transferring payment transaction data from the portable data carrier to the remote terminal based thereon, the portable data carrier being positioned on or in a mobile device, the portable data carrier having stored thereon payment transaction data as well as a list containing as entries a plurality of terminal identifications each having one or more locational positions associated therewith, the portable data carrier including an embedded controller and secure memory unit that are separate from processors and memory of the mobile device, the method being performed by the portable data carrier and comprising:
wirelessly receiving from the remote terminal, via the mobile device, an identification of the remote terminal;
obtaining from the list stored on the portable data carrier a locational position corresponding to the remote terminal identification;
determining, by the embedded controller of the portable data carrier, a locational position of the portable data carrier,
determining, by the embedded controller of the portable data carrier, a locational position of the terminal based on the received identification of the remote terminal, such that both the locational position of the terminal and the locational position of the portable data carrier are determined directly by the portable data carrier without transferring data to other computing systems;
comparing the locational position of the remote terminal with the locational position of the portable data carrier to determine a deviation therebetween; and automatically wirelessly transferring the payment transaction data to the remote terminal only when the deviation is less than or equal to a predetermined threshold so as to prevent unauthorized acquisition of payment transaction data stored on the portable data carrier, the wireless transfer being performed through the mobile device.

16. The method of claim 15, further comprising:
requesting manual confirmation from a user, via the mobile device, when the deviation is greater than the predetermined threshold; and
wirelessly transferring the payment transaction data to the remote terminal after manual confirmation is obtained from the user, the wireless transfer being performed through the mobile device.

17. The method of claim 15, wherein determining the locational position of the portable data carrier comprises:
obtaining a locational position from one or more of: the mobile device, a GPS-enabled device which determines a GPS position, and a radio device which determines a position in a local radio network; and
using the obtained locational position as the locational position of the portable data carrier.

* * * * *